V. E. CHAMBERLIN.
CONTROLLER FOR ELECTRIC MOTORS.
APPLICATION FILED APR. 27, 1907.
928,028.
Patented July 13, 1909.
2 SHEETS—SHEET 1.
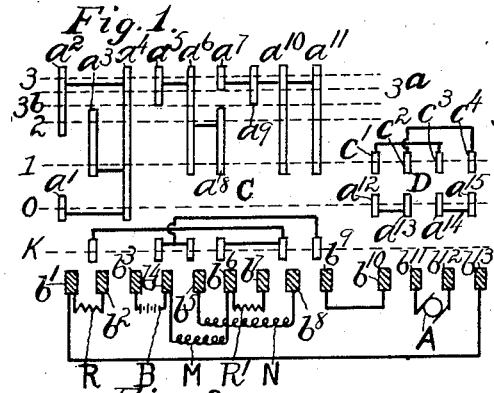
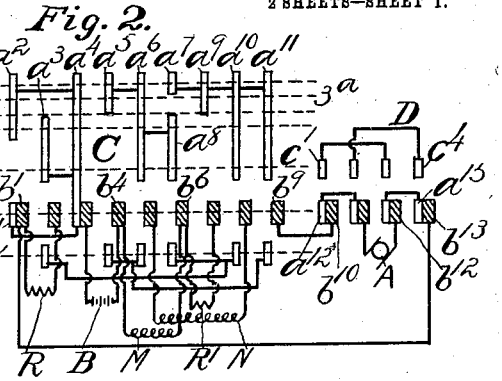
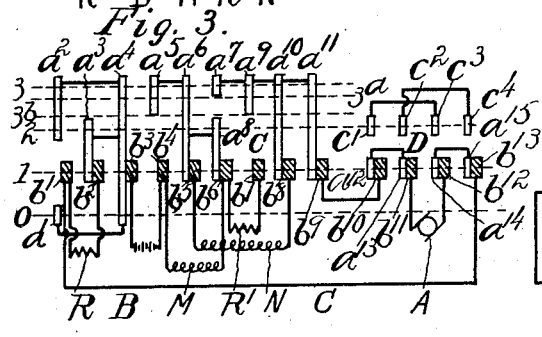
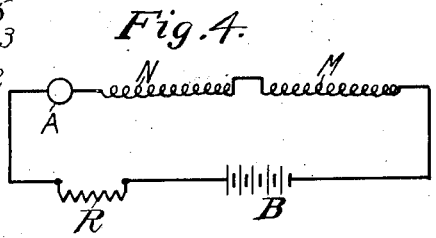
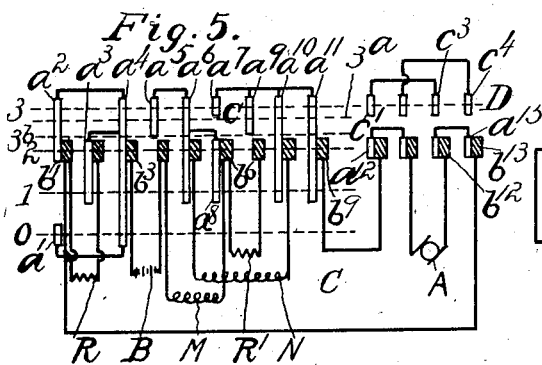
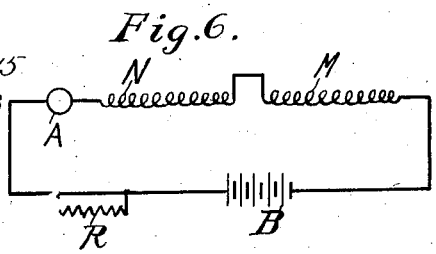
WITNESSES:
INVENTOR:
Victor E. Chamberlin,
BY
Arthur B. Jenkins,
ATTORNEY.

V. E. CHAMBERLIN.
CONTROLLER FOR ELECTRIC MOTORS.
APPLICATION FILED APR. 27, 1907.
928,028.
Patented July 13, 1909.
2 SHEETS—SHEET 2.
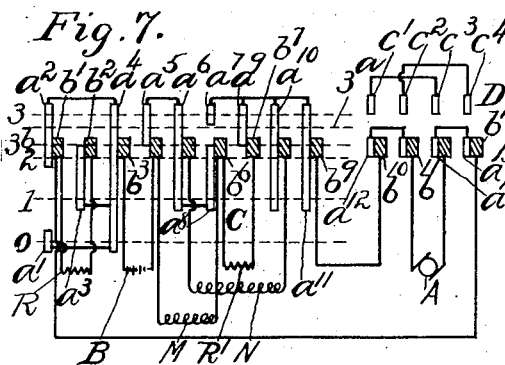
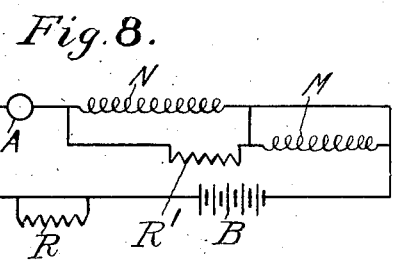
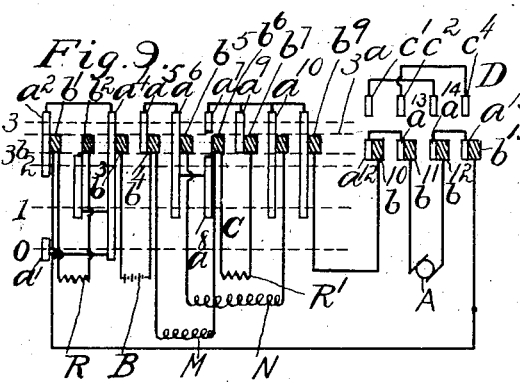
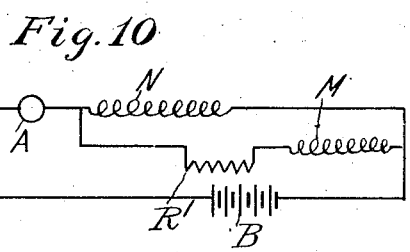
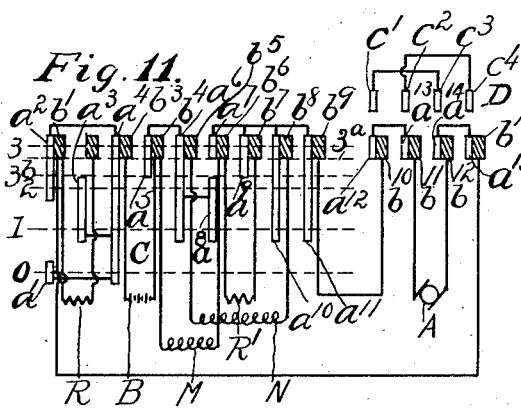
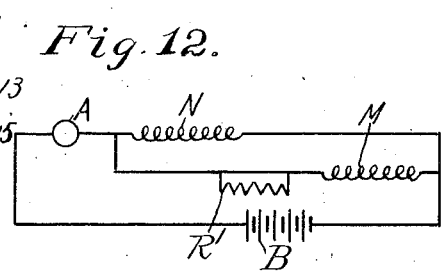
WITNESSES.
L. E. Berkovitch
INVENTOR
Victor E. Chamberlin,
BY Arthur B. Jenkins,
ATTORNEY.

UNITED STATES PATENT OFFICE.

VICTOR E. CHAMBERLIN, OF INDIANAPOLIS, INDIANA, ASSIGNOR TO POPE MANUFACTURING COMPANY, OF JERSEY CITY, NEW JERSEY, A CORPORATION OF NEW JERSEY.

CONTROLLER FOR ELECTRIC MOTORS.

No. 928,028.

Specification of Letters Patent.

Patented July 13, 1909.

Application filed April 27, 1907. Serial No. 370,577.

*To all whom it may concern:*

Be it known that I, VICTOR E. CHAMBERLIN, a citizen of the United States, and a resident of Indianapolis, in the county of Marion and State of Indiana, have invented a new and Improved Controller for Electric Motors, of which the following is a specification.

The invention relates to the class of devices for controlling the operation of electric motors more especially employed as a power for propelling automobiles or the like.

The object of the invention is to provide a device in the use of which all danger of sparking and the subsequent injurious effects of burning of parts, rush of current in the batteries, etc. shall be eliminated; and a further object of the invention is to provide a device for controlling an electric motor in which an unbroken metallic circuit including all the field windings is constantly maintained in all of the different positions of the parts in driving a vehicle at different rates of speed, and throughout the changes in relation of parts during the progression from slowest to fastest speed in either forward or reverse positions.

A form of device in the use of which these objects may be attained is illustrated in the accompanying drawings, in which—

Figure 1 is a diagrammatic view illustrating a motor and a controller embodying my invention. Figs. 2, 3, 5, 7, 9, and 11 are diagrammatic views showing the relative positions of contacts and fingers of a controller arranged to carry out my invention, the brake mechanism not being represented in Figs. 3 to 12, inclusive. Figs. 4, 6, 8, 10 and 12 illustrate the circuit conditions with the controller located in each of its different positions.

In the accompanying drawings the letter A denotes the motor armature, M and N the field windings, two in number, adapted to be arranged in series or in parallel, being employed in the device herein illustrated, B the battery, R and R' resistances and C the main portion of the controller.

The letter K Figs. 1 and 2 denotes contacts upon the controller adapted to convert the motor into an electric generator and thus produce a braking effect upon the vehicle, and D a separate device for reversing the direction of the current through the armature, and thus reversing the direction of rotation of the motor. This reversing mechanism is mounted on a cylinder separate from that of the main part C of the controller and actuated by a separate means but in a manner well-known to devices of this class and for such reason further and detailed description of the reversing mechanism as well as the brake mechanism is omitted.

The controller is illustrated as developed cylinders having contact blades $a^1$ to $a^{11}$ on the main portion and $a^{12}$ to $a^{15}$ on the separate portion thereof, these being employed as shown in the forward driving positions. These blades are secured to the controller in the usual manner and constitute the movable contacts. The characters $b^1$ to $b^{13}$ inclusive indicate the contact fingers or stationary contacts, properly wired up within the circuit and coöperating with the contact blades in controlling the operation of the motor. The characters $c^1$ to $c^4$ indicate the contact blades employed in the reverse driving positions, in connection with the blades $a^1$ to $a^{11}$, which latter are wired up and operated the same in both forward and reverse driving positions, and in a manner to be described.

When the controller is in position with the blades in contact with the fingers along the dotted line O (Fig. 2) the circuit is broken between the fingers $b^8$ and $b^9$, and the motor is thus inoperative. By now moving the controller so that the blades and fingers are in contact along the dotted line 1 the motor becomes operative a circuit being established, as indicated in Fig. 3, from the battery through finger $b^3$, contacts $a^4$, $a^3$, finger $b^2$, resistance R, fingers $b^1$, $b^{13}$, blades $a^{15}$, $a^{14}$, finger $b^{12}$ to the armature A, and from the armature through finger $b^{11}$, blades $a^{13}$, $a^{12}$, fingers $b^{10}$, $b^9$, blades $a^{11}$, $a^{10}$, finger $b^8$ through field circuit N, finger $b^5$, blades $a^6$, $a^8$, and finger $b^6$ through field circuit M and finger $b^4$ to the battery. It will thus be seen that the battery, resistance, armature and fields are connected in series on this first speed, as shown in Fig. 4. By now moving the controller another step forward, bringing the blades and fingers into contact along the dotted line 2, as illustrated in Fig. 5, it will be seen that the circuit is from the battery through finger $b^3$, blade $a^4$, blade $a^2$ to finger $b^1$. The resistance R is thus shunted, otherwise the circuit is in the same condition as on the first speed, that is, with the armature and field in series, as shown in Fig. 6. It will be noted that the continuity of the blades $a^3$, $a^4$, $a^6$, $a^8$, $a^{10}$, and $a^{11}$ retains the connection of the first speed at all points between the first and second speeds and thus prevents the breaking of the circuit. In this second speed all of the current passes through the fields in series giving a strong field, and there are no external resistances in the circuit, thus avoiding any waste of current.

In passing to the next higher or third speed the blades and fingers are brought into and pass out of contact at two intermediate points, that is, along the dotted lines $3^b$ and $3^a$. By moving the controller to these positions, with the fingers and blades in contact along the line $3^b$, as shown in Fig. 7, the current now passes from the battery through finger $b^3$, blades $a^4$, $a^2$ to finger $b^1$, thus shunting the resistance R as in the second speed. From finger $b^1$ the circuit is to finger $b^{13}$, blades $a^{15}$, $a^{14}$, and finger $b^{12}$ to armature A, from armature A through finger $b^{11}$, blades $a^{13}$, $a^{12}$, fingers $b^{11}$, $b^9$, to blade $a^{11}$, where the circuit divides, part going by way of blade $a^{10}$ to finger $b^8$, through field circuit N, finger $b^5$, blades $a^6$, $a^5$, and finger $b^4$ to battery, while the remaining part goes by way of blade $a^9$ and finger $b^7$ through resistance R', finger $b^6$, blades $a^8$, $a^6$, $a^5$ and finger $b^4$ to the battery. It will thus be seen that by bringing the blade $a^5$ into contact a shunt is connected around the field circuit M, the latter, however, being maintained in the circuit through the contact between the blade $a^8$ and finger $b^6$ which has not been broken, while the blade $a^9$ being brought into contact connects a shunt through the resistance R' located between the fingers $b^6$, $b^7$ around the field circuit N. The condition of the circuit thus resulting is painly shown in Fig. 8. In this position of the controller the battery, shunted resistance R, armature A, field circuit N shunted by resistance R' and shunted field M are in series. By now moving the controller to the next intermediate point with the blades and fingers in contact along the line $3^a$, as shown in Fig. 9, it will be noted that the current passes from the battery by finger $b^3$, blades $a^4$, $a^2$, fingers $b^1$, $b^{13}$, blades $a^{15}$, $a^{14}$, and finger $b^{12}$ to the armature A. The resistance R is thus entirely cut out. From armature A the current is by finger $b^{11}$, blades $a^{13}$, $a^{12}$, fingers $b^{10}$, $b^9$, blade $a^{11}$, where the current divides, one part going through blade $a^{10}$, finger $b^8$, through field circuit N, finger $b^5$, blades $a^6$, $a^5$, and finger $b^4$ to battery, while the remaining current passes from blade $a^{11}$ to blade $a^9$, by finger $b^7$, through resistance R', finger $b^6$, field circuit M and finger $b^4$ to battery. On comparing Fig. 9 with Fig. 7 it will be seen that blade $a^8$ leaving contact breaks the shunt around field M and blade $a^9$ remaining in contact, the field circuit M and resistance R' are left in series, and the blades $a^5$, $a^6$ and $a^{10}$ remaining in contact preserve the continuity of field circuit N, which is now in parallel with field M. The battery, armature, and paralleled field circuits M and N are now in series, the resistance R' also being in series with field circuit M, as shown in Fig. 10.

On moving the controller so that the fingers and blades are in contact along the line 3, as shown in Fig. 11, there is no change except that the blade $a^7$ coming in contact with finger $b^6$ connects a shunt around the resistance R', cutting it out of field circuit M, as plainly shown in Fig. 12. It will be noted that in this position, or on the third speed, the battery, armature, and paralleled field circuits are in series, with all external resistances cut out, an arrangement conducive to an efficient use of current in developing power at high speed.

The changes above described are those resulting from a movement of the controller to produce successive speeds from the lowest to the highest, and it is evident that the changes and conditions will be merely reversed in moving the controller through the successive steps in changing from highest to the lowest speed.

From the above description it will be seen that the metallic circuit has always included both fields M and N and has remained unbroken throughout the entire change from lowest to highest speed and will remain unbroken in change from highest to lowest speed, and although the fields have been changed from series to parallel relation and vice versa each field circuit has remained unbroken. This maintaining of the metallic circuit at all points avoids any danger of sparking and burning of the parts and of injury to the batteries by reason of sudden rushes of current incident to devices where the circuit is broken at points during the several changes.

In changing from the second to third speeds while passing through the first and second intermediate stages the movement of the cylinder will be almost continuous, although I do not limit my invention to an apparatus embodying such a feature, as a stop may be made on either or both the first and second intermediate steps to maintain the speed attained with the arrangement of circuit in these positions, thus giving additional running positions, and enabling a controller for a vehicle having more than three forward speeds to be constructed.

What I claim as my invention and desire to secure by Letters Patent is:—

1. A source of electricity, a motor having a plurality of field windings, and a controller having contacts forming part of the circuit and constructed and adapted to continuously maintain the circuit throughout by full contact between the fingers and blades and thereby change the relative arrangement of the field windings without breaking the connection with either of the field windings during said operation.

2. A source of electricity, a motor with a plurality of field windings, and a controller having contacts forming part of the circuit and arranged and connected to continuously maintain the circuit throughout by full contact between the fingers and blades and thereby close the circuit with the field windings in series, and to change the circuit to include the field windings in parallel and without breaking the connection with either of the field windings during all of said operations.

3. A source of electricity, a motor having a plurality of field windings connected in parallel relation therewith, and a controller having contacts forming part of the circuit and arranged and adapted to continuously maintain the circuit throughout by full contact between the fingers and blades and thereby change the circuit to include the field windings in series and without breaking the connection with either field winding during said operation.

4. A source of electricity, a motor having a plural number of field windings, and a controller having contacts forming part of the circuit and arranged and connected to close the circuit with the fields in series, to shunt one of said fields and then change the circuit to include the fields in parallel without breaking the connection with either of said fields during all of said operations.

5. A source of electricity, a motor having a plurality of field windings, a resistance, and a controller having contacts forming a part of the circuit and arranged and connected to close the circuit with the fields in series, then change the circuit to include a field and resistance in series in parallel with another field, and then connect the fields in parallel without breaking the connection with either during all of said operations.

6. A source of electricity, a motor having a plurality of field windings, a resistance, and a controller having contacts forming a part of the circuit and arranged and connected to close the circuit with the fields in series, then change the circuit to throw a shunt around one field and include a resistance in parallel with another field and then connect the fields, in parallel without breaking the connection with either field during all of said operations.

7. A source of electricity, a motor having a plurality of field windings, a resistance and a controller having contacts forming part of the circuit and arranged and connected to include the fields in series, then change the circuit to include the resistance and a field in parallel and a shunted field, then change the circuit to include a field in parallel with a field having a resistance in series with it, and then to remove said resistance and maintain the fields in parallel without breaking the connection with either of the field windings during all of said operations.

8. A source of electricity, a motor having a plurality of field windings, and a controller movably mounted to vary the circuit conditions and having contacts forming part of the circuit and arranged and connected to continuously maintain the circuit throughout by full contact between the fingers and blades and thereby include the field windings in series in one position of the controller, and to include said field windings in parallel and in a succeeding position of the controller and without breaking the connection with either of the field windings during all of said operations.

9. A source of electricity, a motor having a plural number of field windings, a resistance, and a controller movably mounted and having contacts forming part of the circuit and arranged and connected to include the field windings in series in one position of the controller, to include the resistance in parallel with a field winding in another position of the controller, and to remove said resistance and include the field windings in parallel and without breaking the connection with either of said field windings during all of said operations.

10. A source of electricity, a motor having a plural number of field windings, a resistance, and a controller movably mounted and having contacts forming part of the electric circuit and arranged and connected to include the fields in series in one position of the controller, to include the resistance and a field in series in parallel with another field in another position of the controller, and to remove said resistance and maintain the fields in parallel in another position of the controller and without breaking the connection with either of said fields during all of said operations.

11. A source of electricity, a motor including a number of field windings, a resistance, and a controller movably mounted and having contacts forming part of the circuit and arranged and connected to include the fields in series in one position of the controller, to include the resistance and a field in parallel and a shunted field in another position of the controller, to include a resistance and field in series in parallel with another field in another position of the controller, and the fields in parallel with said resistance removed in another position of the controller and without breaking the connection with either field during all of said operations.

12. A source of electricity, a motor having a plurality of field windings, a controller having contact blades forming part of the circuit, contact fingers included in the circuit, each of the blades in a single line being arranged to connect with a contact finger before disengagement from another contact finger, said blades and fingers being constructed and adapted to change the relative arrangement of the field windings without breaking the connection with either of the field windings during said operation.

VICTOR E. CHAMBERLIN.

Witnesses:
D. V. CLEM,
E. K. SHUGERT.